No. 830,915. PATENTED SEPT. 11, 1906.
J. W. MYERS.
DEVICE FOR TEACHING THE PLAYING OF STRINGED INSTRUMENTS.
APPLICATION FILED NOV. 18, 1903.
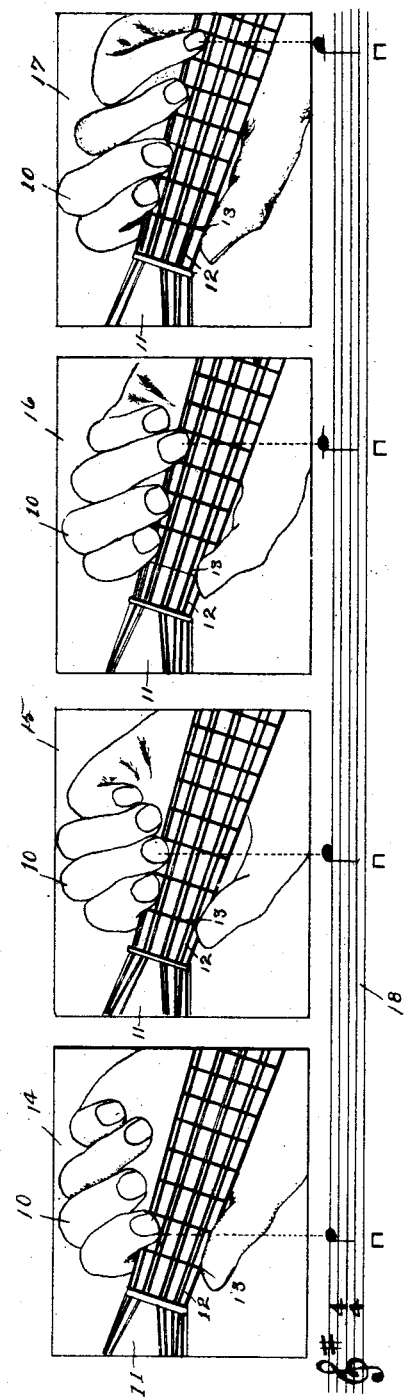
Witnesses
A. G. Hague.
S. F. Christy.
Inventor: J. W. Myers.
By Orwig & Lane Attys.
THE NORRIS PETERS CO., WASHINGTON, D. C.

UNITED STATES PATENT OFFICE.

JOHN W. MYERS, OF DES MOINES, IOWA.

DEVICE FOR TEACHING THE PLAYING OF STRINGED INSTRUMENTS.

No. 830,915.  Specification of Letters Patent.  Patented Sept. 11, 1906.

Application filed November 18, 1903. Serial No. 181,601.

*To all whom it may concern:*

Be it known that I, JOHN W. MYERS, a citizen of the United States, residing at Des Moines, in the county of Polk and State of Iowa, have invented a certain new and useful Device for Teaching the Playing of Stringed Instruments, of which the following is a specification.

The objects of my invention are to provide an explanatory arrangement of a stringed instrument with a hand in position thereon and a line running from its finger which is in position on the stringed instrument to a note which is in an adjacent bar of music.

A further object is to provide for an arrangement of this kind which can be easily photographed or from which a sketch or other representation can be easily made to designate the exact position of all of the fingers of the player's hand relative to the instrument and to each other to thereby acquaint the player with the proper position of the fingers not actively engaged, as well as the ones in use, when playing a certain note or chord on said instrument. It is my purpose to provide a series of representations showing the different positions of the hand in each representation and showing the note which is to be played when the hand is in a particular position on and relative to the instrument. The further object of doing this is to provide means whereby the positioning of the hand relative to the instrument which is to be played can be easily put upon paper, so as to be transmitted through the mails, and thus afford an arrangement which can be easily and readily understood by a person who is learning to play the instrument without the presence of the instructor—that is to say, the teaching of music is made simple by the use of my arrangement by correspondence.

My invention consists in the arrangement and combination of the various parts of the chart, whereby the objects contemplated are attained, as hereinafter more fully set forth, pointed out in my claims, and illustrated in the accompanying drawing, in which the drawing shows a series of representations of a hand in different positions on the strings of a mandolin and showing the different positions of a hand when playing a given note. A bar of music is placed beneath this series of representations, and a line runs down from the finger to a note in a bar adjacent to the representations of the hand, thus designating the note which is to be played.

Referring to the accompanying drawing, I have used the reference-numeral 10 to indicate the hand throughout the drawing, and the reference-numeral 11 to indicate the instrument, having a series of strings 12 thereon arranged as is customary in the ordinary instrument, with the fret 13 extending beneath them.

The reference-numeral 14 indicates the first representation of the hand on the instrument. The reference-numeral 15 indicates the second representation of the hand on the instrument. The reference-numeral 16 indicates the third position of the hand on the instrument, and the reference-numeral 17 indicates the fourth position of the hand on the instrument. These representations shown in the first, second, third, and fourth positions are either arranged in line with each other or they may be arranged in any other desirable way. When the representations 14, 15, 16, and 17 are arranged in line, I have provided a bar of music 18, which extends beneath these representations. Extending from each note in the bar to a finger in the hand is a line preferably dotted to indicate that the finger is in a certain position on the instrument when the note from which the line runs is to be played. This line runs from a different finger in each of the representations shown in the accompanying drawing. To illustrate this principle clearly, I have shown the bar of music having the note F beneath the representation 14, the note G beneath the representation 15, the note A beneath the representation 16, and the note B beneath the representation 17 and a line running directly from the finger which is used in playing the note F to said note and a line running from the finger which is used in playing the note G to said note, and a line running from the finger playing the note A to said note, and a line running from the finger playing the note B to said note. In playing the note F the first or fore finger is placed on the strings, as shown in the representation 14. In playing the note G the second or middle finger is placed on the strings in the position shown in the representation 15. In playing the note A the third finger is placed on the strings in the position shown in the representation 16, and in playing the note B the fourth or little finger is placed on the strings in the position shown in the representation 17. By this arrangement it is very clear to the person studying music what the exact position of the hand is in playing a given note and the way in which the fingering on the stringed instrument is accomplished, as he can see readily from the photograph or sketch exactly what position the hand is in and by comparing it with the position of his hand he can ascertain whether he is obtaining a correct position or not with the greatest ease. In this connection it is to be noted that in instructing a pupil it is of prime importance that he learn not only the point or points on the instrument where his finger-tips are to be placed, but also the correct, easy, and graceful position for the hand and the finger actively engaged, and it is of equal importance that he know the correct, easy, and graceful position for the fingers not actively in use, as in order to acquire skill it is essential that the unengaged fingers be held in such position that they will not interfere and also that they may be in readiness to be brought instantly into use when required. Heretofore charts for the purpose of teaching the playing of music have only indicated to the player the positions for the finger-tips that were actively engaged and the learner left wholly in the dark as to the correct, easy, and graceful positions for the remainder of the fingers actively engaged and those not in immediate use. Full directions, of course, are given either above or beneath the representations or on a separate sheet of paper which accompanies the representations when they are sent out by the correspondence school, thus making it absolutely clear what the lesson for the day is and how it is to be practiced. It is my object to use a series of these representations one after another, commencing with the scales and simple fingering of the stringed instrument and carrying it into more complicated music from time to time. Any instrument which is controlled by the fingering of the parts of said instrument may be taught by this method.

The way of obtaining the representation may vary. One way which seems desirable is for the instructor to hold the instrument in the desired position for playing a given note and have a photograph taken of the hand and instrument in this position, then to make a reproduction of this photograph in large quantities and draw the bar of music beneath the representation and draw the lines from the finger to the bar. Another very simple way is to make a drawing like the accompanying one in this case, showing the position of the hand. It is very advantageous in the teaching of the playing of a stringed instrument by correspondence to show the exact position of the entire hand on the instrument when playing a given note. Not only is it advantageous to show the exact position of the finger which is placed on the string of the instrument, but also show the position of the thumb and the other fingers in their relation to the finger which is being used primarily. This accomplishes the result of enabling the player to clearly see the proper position in which his hand should be in playing the given notes so that he can be a graceful player by carefully examining the photographic representation shown in my chart and adapting his hand to the positions shown in the chart.

Having thus described my invention, what I claim, and desire to secure by Letters Patent of the United States therefor, is—

1. A chart illustrating a bar of music, a finger-board of a musical instrument, a player's hand in position relative to the instrument and denoting the correct position of the finger actively engaged, and an indicating-mark denoting the finger to be used for a certain note on the bar.

2. A chart illustrating a bar of music, a finger-board of a musical instrument, a player's hand in position relative to the instrument and denoting the correct position of the finger actively engaged, said finger positioned on a line at right angles through the bar at a certain note thereon.

3. A chart comprising a bar of music, a pictorial representation of the finger-board portion of a stringed instrument, and a player's hand in position relative to the instrument illustrating the correct position of the finger actively engaged and also illustrating the correct position, relative to the instrument and to each other, of the fingers not actively in use, and a line connecting the finger actively engaged with a note on the bar of music.

JOHN W. MYERS.

Witnesses:
S. F. CHRISTY,
W. R. LANE.